United States Patent [19]

Kokubun et al.

[11] Patent Number: 4,954,697

[45] Date of Patent: Sep. 4, 1990

[54] VENDING APPARATUS FOR SELF-SERVICE STORE

[75] Inventors: Yoshikazu Kokubun; Akihito Kurosawa; Kohei Ushikubo; Shinji Todokoro, all of Gunma, Japan

[73] Assignee: Sanden Corporation, Gunma, Japan

[21] Appl. No.: 333,804

[22] Filed: Apr. 6, 1989

Related U.S. Application Data

[63] Continuation of Ser. No. 915,647, Oct. 6, 1986, abandoned.

[30] Foreign Application Priority Data

Oct. 5, 1985 [JP] Japan ................................ 60-222317

[51] Int. Cl.[5] ................................................ G06F 7/08

[52] U.S. Cl. ........................................ 235/381; 221/3; 340/711

[58] Field of Search .................. 235/381, 383; 365/63; 369/30, 64; 360/12; 364/479; 340/711; 221/2, 3

[56] References Cited

U.S. PATENT DOCUMENTS

| | | | |
|---|---|---|---|
| Re. 30,773 | 10/1981 | Glaser et al. | 235/381 X |
| Re. 32,115 | 4/1986 | Lockwood et al. | 360/12 X |
| 3,258,153 | 6/1966 | Morgan et al. | 221/3 |
| 3,757,037 | 9/1973 | Bialek | 340/711 X |
| 4,282,575 | 8/1981 | Hoskinson et al. | 364/479 |
| 4,567,359 | 1/1986 | Lockwood | 235/381 |

*Primary Examiner*—David L. Trafton

*Attorney, Agent, or Firm*—Finnegan, Henderson, Farabow, Garrett, and Dunner

[57] ABSTRACT

A vending apparatus comprises a cabinet for storing a plurality of items available for purchase; a memory for storing product data associated with the plurality of items; a message device for visually or audibly reproducing selected segments of the stored product data; an input device for receiving selection and designation data from a user in accordance with the data in the message device; a deposit mechanism for receiving payment for items selected for purchase; and a dispenser responsive to the deposit mechanism and the input device for ejecting items selected by the user for receipt by the user.

3 Claims, 3 Drawing Sheets

VENDING APPARATUS FOR SELF-SERVICE STORE

This application is a continuation-in-part, continuation, division, of application Ser. No. 06/915,647, filed 10/6/86 now abandoned.

BACKGROUND OF THE INVENTION

This invention relates to an automatic vending apparatus allowing the sale of a large assortment of goods.

A conventional vending machine is so constructed as to include a merchandise storage container and a dispensing mechanism within an enclosed cabinet. The cabinet generally includes a merchandise display section, merchandise selection buttons, a slot, a merchandise delivery opening, etc. arranged on its front door. One vending machine thus can be used to sell only a limited amount and variety of merchandise. As a consequence, multiple vending machines must be installed to sell large varieties of goods, and this is costly. Users, on the other hand, have to bear the inconvenience arising from use of a plurality of different vending machines.

Assuming that a vending machine equipped with a larger merchandise storage container is installed to increase the available assortment of goods, the merchandise display section unavoidably becomes large, and this requires the vending machine to have a very wide frontage. As the assortment of goods increases, users also experience a great deal of inconvenience in locating a particular desired item and pushing the corresponding button. That inconvenience includes the frequent incorrect selection of undesired merchandise.

SUMMARY OF THE INVENTION

Accordingly, it is an object of the present invention to automatically vend a greater variety of goods from a compact and easily operable machine.

Another object of the invention is to increase the variety of merchandise available in a vending machine without unduly complicating operation of the device.

It is a further object of the invention to maintain the size of the display panel of a vending machine while increasing the variety of goods available in the machine.

Additional objects and advantages will be set forth in part in the description which follows, and in part will be obvious from the description, or may be learned by practice of the invention.

To achieve the foregoing objects and in accordance with the purpose of the invention, as embodied and broadly described herein, the vending apparatus of the present invention comprises cabinet means provide with storage means for storing a plurality of items available for purchase; memory means for storing product data associated with the plurality of items; information transmit means for visually or audibly reproducing selected segments of the product data; input means for receiving selection and designation data from a user in accordance with the data in the message means; deposit means for receiving payment for items selected for purchase; and dispensing means responsive to the payment means and the input means for ejecting items selected by the user for receipt by the user. Preferably, the information transmit means includes image display means for displaying visual information on the products available for purchase, and speaker means for reproducing audio information on those products.

It is also preferred that the image display means include an image display unit having a display panel, and that the input means include a touch sensing input device on the display panel.

The deposit means preferably includes at least one of a coin slot, a bill slot, and a card receiving slot, and an auxiliary control keyboard may optionally be included. The deposit means may also include change return means.

It is preferred that the dispensing means include a delivery port, and conveyor means for transporting selected merchandise from the storage means to the delivery port. The delivery port preferably includes a door, and locking means for holding the door in a locked position until the merchandise is deposited in the delivery port.

The product data may include multiple screen displays of more precise product information on successive screen displays. Means for bypassing selected ones of the screen displays may be included in that instance. The apparatus may also include means for terminating the sequence of operation of the apparatus.

BRIEF DESCRIPTION OF THE DRAWINGS

The accompanying drawings, which are incorporated in and constitute a part of this specification, illustrate one embodiment of the invention and, together with the description serve to explain the principles of the invention.

Of the drawings:

FIG. 4 shows a scene in the initial selling stage;

FIG. 5 shows a scene when 1 of FIG. 4 is selected;

FIG. 6 shows a scene when 3 of FIG. 5 is selected;

FIG. 7 shows a scene when a target item of merchandise of FIG. 6 is selected; and FIG. 8 shows a scene when 2 of FIG. 4 is selected.

DETAILED DESCRIPTION OF THE INVENTION

Figure 1:
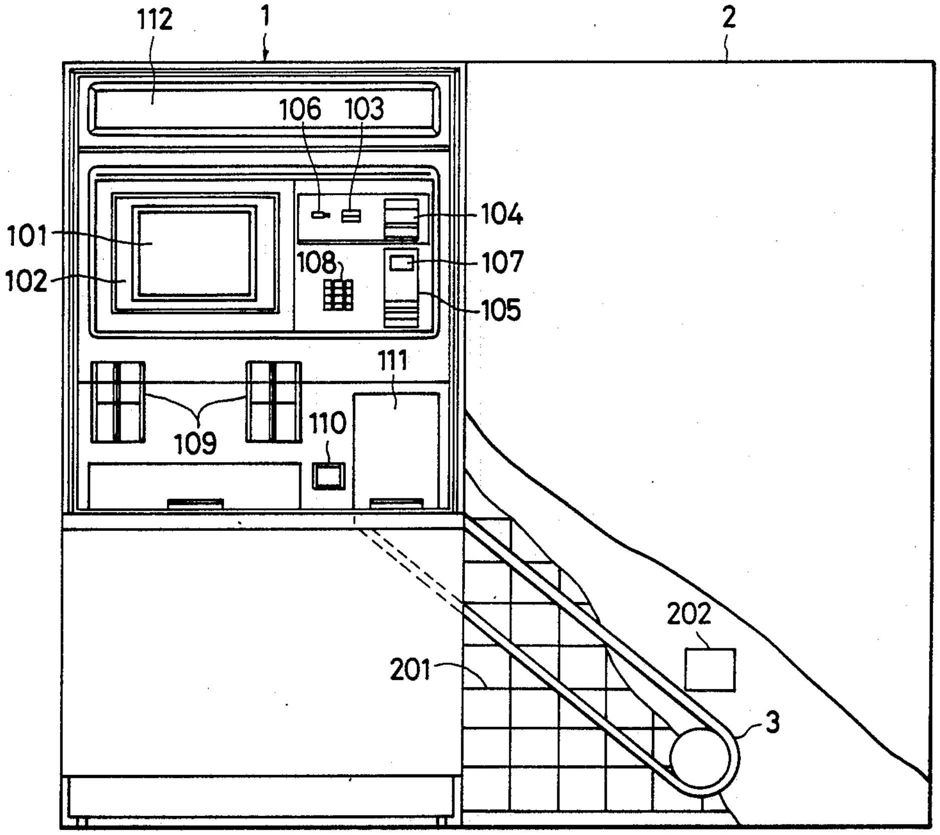
FIG. 1 is an elevational view of a vending apparatus for self-service store embodying the present invention.

Referring now to the drawings, an embodiment of the present invention will be described.

Figure 2:
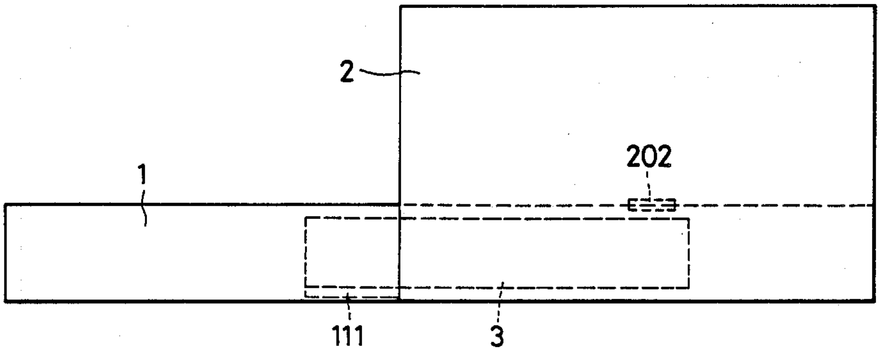
FIG. 2 is a top view thereof.

A vending apparatus for a self-service store shown in FIGS. 1 and 2 comprises customer-receiving means 1, a merchandise container 2 and a conveyor 3.

The customer-receiving means is equipped with a frontal CRT 101, a touch sensing input device (hereinafter simply called a touch switch) 102 installed on the front panel of a display means of the CRT, a coin slot 103, a bill slot 104, a card slot 105, money return lever 106, an indicator 107 for indicating the amount of deposit, auxiliary input keys 108, at least one of speakers 109, a change receptable 110, a merchandise delivery port 111 and an illumination/advertising means 112.

As will be described later, the CRT 101 is intended to display the introduction of merchandise for sale and instructions as to purchase operation. The touch switch 102 corresponds to the selection buttons of the conventional vending machine and allows the user to select the goods introduced on the screen and input purchase items desired.

Together with means already known, such as a coin acceptor for detecting a deposited amount, a bill validation and a card acceptor (not shown) for checking whether or not the holder is authorized to buy goods on credit, the bill slot 104 and the card slot 105 constitute a price deposit means. The money return lever 106, the indicator 107, the change receptable 110 and the merchandise delivery port 111 are similar to those employed for a conventional vending machine.

As will also be described later, the speaker 109 is intended to output an advertising message for attracting customers' attention, an instructive message for explaining how to operate the machine, or an introduction to the merchandise.

The illumination/advertising means 112 illuminates the front of the customer-receiving unit 1 and displays advertising signs.

The merchandise container 2 is equipped with a number of shelves for storing goods and a merchandise-dispensing mechanism (not shown) for sending the goods stored on the shelves one at a time to the merchandise-dispensing port.

As the merchandise container 2, one of the known means can be used by scaling it up. For example, automatically-controlled warehouse, a cigarette (including its dispensing mechanism) for a cigarette vendor, a serpentine-type merchandise container, a spiral-type merchandise container or a chain-elevator type merchandise container may be used. Alternatively, separate units of such means may be installed in parallel (resulting in a plurality of dispensing ports which can be combined by a chute into a single unit). Since such an arrangement may be implemented by utilizing known components, the description thereof will be omitted. Obviously, for example, refrigerator or a heater supplied with an insulator are usable for storing or dispensing merchandise that must be refrigerated and heated, respectively.

As shown in FIG. 1, the conveyor 3 is formed with a belt conveyor and is used to convey the goods dispensed from the dispensing port 202 to the merchandise delivery port 111. An electric circuit such as a control means for automatic vending is contained in the lower inside of the customer-receiving means 1.

Figure 3:
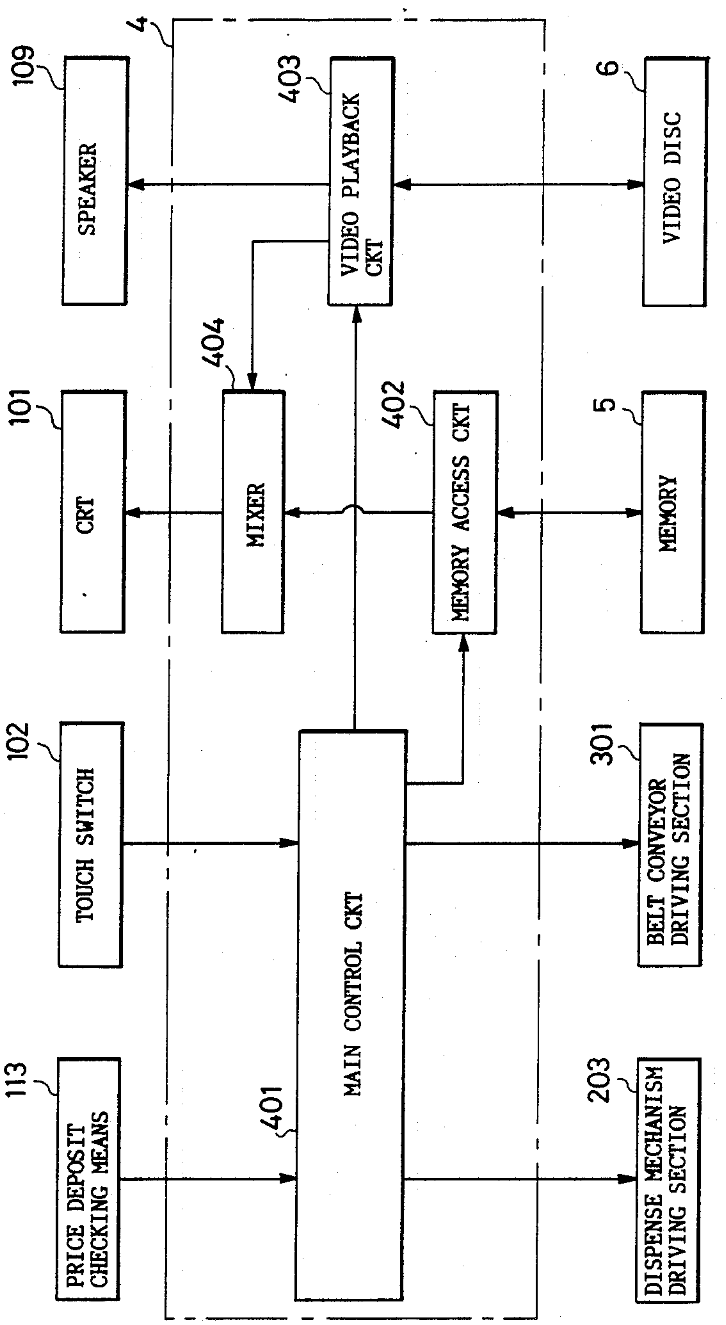
FIG. 3 is a block diagram of the electric system chart thereof.

As shown in FIG. 3, the electric circuit is equipped with a control circuit 4 for controlling the display operation of the CRT 101 and the production of messages from the speaker 109, a driving means 203 for driving the dispense mechanism of the merchandise container 2, a driving means 301 for driving the belt conveyor 3, a memory 5 and a video disc 6.

The memory 5 stores data on the display of characters representing the names of goods displayed on the CRT 101 and instructions at the time of sales. The video disc 6 records the static images of goods displayed on the CRT 101, advertising pictures, music and messages voiced by the speaker 109 to attract customers' attention or to give operational instructions for purchasing goods.

The control circuit 4 has a main control circuit 401 for making operations and controlling the dispenses mechanism driving means 203 and the conveyor driving means 301. The circuit 401 receives data of deposited amounts, and signals representing authorized card holders from the coin acceptor, the bill validator, the card acceptor, etc. of the above price payment means (collectively called a price deposit checking means 113), and input signals from the touch switch 102.

The control circuit 4 is further equipped with a memory access circuit 402 for accessing the memory 5 and reading out the contents thereof, and a playback circuit 403 for playing back the recorded signals from video disc 6. The signals read out of the memory 5 and the image signals played back from the video disc 6 are mixed together by a mixer 403, and the mixed signals are supplied to the CRT 101 and displayed as pictures. The audio signals reproduced by the video disc 6 are supplied to the speaker 109 and produced as sounds.

The main control circuit 401 controls the memory access circuit 402 and the video playback circuit 403 according to a predetermined program in response to the signals sent by the price deposit means 113 and the touch switch 102.

The operation of the vending apparatus will subsequently be described.

While the vending apparatus for a self-service store is on standby, the main control circuit 401 controls the video playback circuit 403 so as to make it playback images, music and messages for advertising and publicity, and allows the CRT 101 and the speaker 109 to display pictures and corresponding messages.

Figure 4:
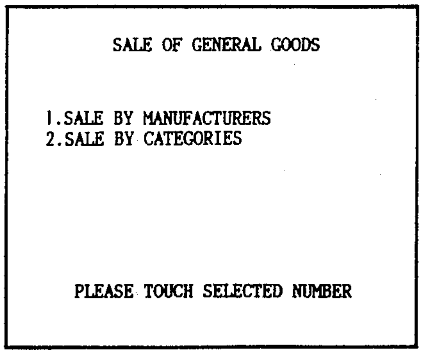
FIGS. 4 through 8 show examples of scenes displayed on the display unit at different selling stages.

When coin, bill or a card is inserted into the coin slot 103, the bill slot 104 or the card slot 105, the main control circuit 401 detects the input by means of the signal given by the price deposit checking means 113. This simultaneously starts the memory access circuit 402, reads an inquiry as to the sales method and causes the CRT 101 to display the inquiry. FIG. 4 shows an example of the contents of the display.

Figure 5:
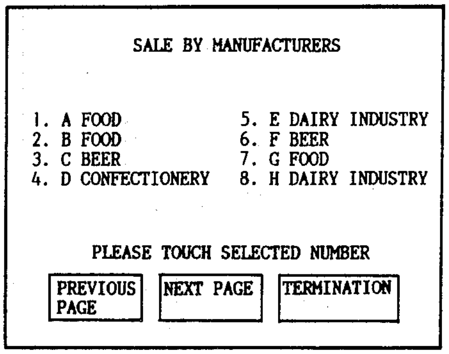

When a customer touches No. 1 reading "Sale by Manufacturers", the main control circuit 401 again controls the memory access circuit 402 in compliance with the signal from the touch switch 102 allowing a list of manufacturers to be read out of the memory 5 and displayed on the CRT 101. FIG. 5 shows an example of the picture displayed on the CRT 101.

In case the number of manufacturers is too large to display on the CRT at one time, the displays of "Preceding Page" and "Next Page" shown in FIG. 5 are displayed on the CRT. When the customer presses either one of these, a list of manufacturers on the next page or the preceding page is displayed, as appropriate.

Figure 6:
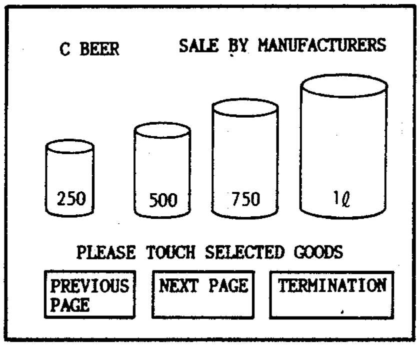

Assuming the customer touches No. 3 reading "Beer C" included in the list of manufacturers shown in FIG. 5, the main control circuit 401 senses the action on receiving the signal from the touch switch 102, and controls the video playback circuit 403 so that a picture of goods marketed by a beer company C on the video disc 6 may be displayed on the CRT 101. FIG. 6 shows the display on the CRT 101. As shown in FIG. 6, it is preferred to allow the main control circuit 401 to control the memory access circuit 402 in such a manner as to read a necessary description out of the memory 5 and display it simultaneously on the CRT 101.

In case the number of goods is too large, the main control circuit 401 and the video disc playback circuit 403 may also be arranged to make them display another group of goods depending on the touch on the display, by displaying "Preceding Page" and "Next Page".

Figure 7:
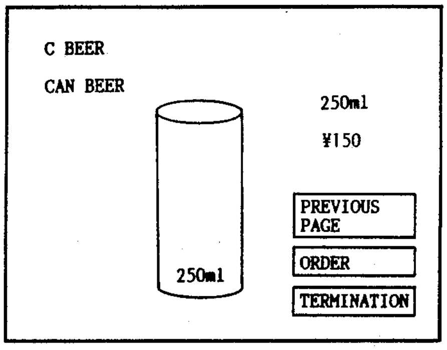

When the customer touches the picture of a 250 ml can of beer shown in FIG. 6, the main control circuit 401 senses the action by means of the signal from the touch switch 102 and controls the video disc playback circuit 402 to make it display an enlarged 250 ml can beer on the CRT 101. Simultaneously, the main control circuit 401 controls the memory access circuit 402 so as to display character displays of "250 ml" as it quantity, "150" as its price, "Preceding Page" for having a group of goods listed on the preceding page restored, and "Order" for ordering the displayed item. FIG. 7 shows the display on the CRT 101.

When the customer touches the character display of "Order", the main control circuit 401 senses the action by means of the signal from the touch switch 102 compares the selling price "150" with the amount deposited through the price deposit checking means 113. The main control circuit 401 then controls the merchandises dispense mechanism driving means 203 to allow the 250 ml can of beer to be dispensed from the shelf to the dispens dispensing port 202. This also causes the conveyor driving means 301 to operate, unless the deposited amount is short or the inserted card authorizes the holder to buy on credit.

The merchandise is thus conveyed to the merchandise delivery port 111 and the customer can obtain the merchandise desired. The door of the delivery port 111 should preferably be locked by a solenoid or the like until the merchandise is conveyed thereto.

When it is necessary to make change, the return lever or change mechanism is operated after a fixed time to give the change. Then the main control circuit 402 returns to the standby state.

The display of "Termination" shown in FIGS. 5 through 7 is provided so that it may be actuated when the customer gives up halfway. A touch on this display completely returns the main control circuit to the standby state.

Figure 8:
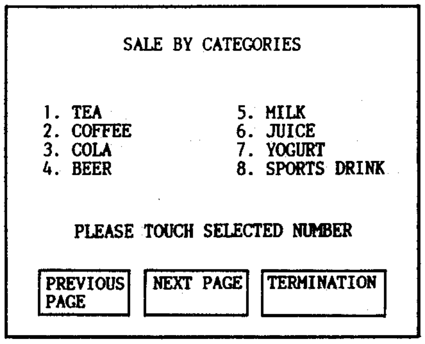

FIG. 8 shows a display on the CRT 101 when the customer touches No. 2, reading "Sales by Categories". As shown in FIG. 8, a list of merchandise assortments is read out of the memory 5 and displayed. When the customer touches No. 1 representing "Tea", for instance, an image indicative of a group of tea goods is read out of the video disc 6 and displayed on the CRT 101. Since the following operation is the same as what has been described, it will be omitted.

A message corresponding to what has been displayed on the CRT, or other messages may be produced from the speaker 109.

Instead of sales by both manufacturers and categories, either one may be employed when the sales operation is started by bypassing the display of FIG. 4.

The auxiliary keys of FIG. 1 may be used in place of the touch switch 102, and include ten keys and the function switches of "Preceding Page", "Next Page", "Termination" and "Order". The auxiliary keys 108 may be installed instead of the touch switch or may be absent.

As set forth above, the customer-receiving means coupled to the merchandise delivery port with the conveyor according to the present invention makes it possible to provide a larger scale of merchandise-containing space to sell many kinds of goods without confusing users of the vending machine. Moreover, the image display unit is installed on the customer-receiving means to introduce merchandise and enable the user to select the goods desired by operating the input means in accordance with the contents of a display. Thus, the space required for sales exhibits of multiple merchandise is limited to the area of the image display means. It is unnecessary to use large number of selection buttons, or a wide frontage of the customer-receiving means. As a result, users can quickly and easily locate the selection button desired.

We claim:

1. A vending apparatus, comprising:

cabinet means provided with storage means for storing a plurality of different items available for purchase;

memory means for storing product data associated with said plurality of different stored items, said product data including multiple displays of more precise product information on successive screen displays;

information transmission means for visually and audibly reproducing selected corresponding segments of the product data including image display means for displaying visual video information on said plurality of different stored products available for purchase, and speaker means for reproducing audio information corresponding to said plurality of different stored products available for purchase, said image display means including an image display unit having a display panel;

input means for receiving selection and designation data from user in accordance with the data in said information transmission means, said input means including a touch sensing input device on said display panel;

deposit means for receiving payment for items selected for purchase; and dispensing means responsive to the payment means and the input means for ejecting items selected by the user for receipt by the user.

2. The apparatus of claim 1 also including means for bypassing selected ones of the screen displays.

3. The apparatus of claim 1 also including means for terminating the sequence of operation of the apparatus.

* * * * *